(12) United States Patent
Gershony

(10) Patent No.: US 11,985,624 B2
(45) Date of Patent: May 14, 2024

(54) SYSTEM METHOD AND COMPUTER PROGRAM PRODUCT FOR DIRECTION FINDING AND/OR IDENTIFICATION OF GEO-LOCATION, FOR MOBILE PHONES OPERATING IN LTE (4G)

(71) Applicant: ELTA SYSTEMS LTD., Ashdod (IL)

(72) Inventor: Yehonatan Gershony, Gan Yavne (IL)

(73) Assignee: ELTA SYSTEMS LTD., Ashdod (IL)

( * ) Notice: Subject to any disclaimer, the term of this patent is extended or adjusted under 35 U.S.C. 154(b) by 435 days.

(21) Appl. No.: 17/296,183

(22) PCT Filed: Oct. 31, 2019

(86) PCT No.: PCT/IL2019/051184
§ 371 (c)(1),
(2) Date: May 21, 2021

(87) PCT Pub. No.: WO2020/105025
PCT Pub. Date: May 28, 2020

(65) Prior Publication Data
US 2022/0022156 A1      Jan. 20, 2022

(30) Foreign Application Priority Data
Nov. 22, 2018 (IL) .......................................... 263246

(51) Int. Cl.
*H04W 64/00* (2009.01)
*H04L 5/00* (2006.01)
(Continued)

(52) U.S. Cl.
CPC ......... *H04W 64/003* (2013.01); *H04L 5/0048* (2013.01); *H04W 4/023* (2013.01);
(Continued)

(58) Field of Classification Search
CPC ... H04W 64/003; H04W 4/023; H04W 4/029; H04W 48/18; H04W 64/006; H04W 72/21; H04W 72/23; H04W 88/06
See application file for complete search history.

(56) References Cited

U.S. PATENT DOCUMENTS 6,943,729 B2    9/2005  Dobson
2002/0128020 A1*  9/2002  Carlson ................. G01S 5/0081
                                                        342/464

(Continued)

FOREIGN PATENT DOCUMENTS

EP      1 051 053 A2   11/2011
WO    2005/011317 A1    2/2005
(Continued)

OTHER PUBLICATIONS howltestuffworks.blogspot.com, 2020, pp. 1-13.
(Continued)

*Primary Examiner* — Barry W Taylor
(74) *Attorney, Agent, or Firm* — Browdy and Neimark, PLLC

(57) ABSTRACT

A system for localizing cellphones served by commercial network of base-stations and operative in conjunction with at least one catcher including a catcher-controller, and at least one transmitter and at least one receiver, thereby to define an area of coverage for the catcher, the system comprising at least one DF/geolocation module including a DF/geolocation controller and at least one set of receivers operative to receive uplink signal/s transmitted by cellphone/s.

17 Claims, 6 Drawing Sheets

(51) Int. Cl.
*H04W 4/02* (2018.01)
*H04W 4/029* (2018.01)
*H04W 48/18* (2009.01)
*H04W 72/21* (2023.01)
*H04W 72/23* (2023.01)
*H04W 88/06* (2009.01)

(52) U.S. Cl.
CPC .......... *H04W 4/029* (2018.02); *H04W 48/18* (2013.01); *H04W 64/006* (2013.01); *H04W 72/21* (2023.01); *H04W 72/23* (2023.01); *H04W 88/06* (2013.01)

(56) References Cited

U.S. PATENT DOCUMENTS

| | | | | |
|---|---|---|---|---|
| 2003/0103003 A1* | 6/2003 | Ferreol | ............... | G01S 3/74 342/432 |
| 2004/0219927 A1* | 11/2004 | Sumner | ............... | H04W 64/00 455/456.3 |
| 2008/0311941 A1* | 12/2008 | Yanover | ............... | H04W 72/20 455/509 |
| 2009/0092071 A1* | 4/2009 | Mohanty | ............... | H04W 8/26 370/312 |
| 2010/0309852 A1 | 12/2010 | Li et al. | | |
| 2011/0124347 A1 | 5/2011 | Chen et al. | | |
| 2012/0202558 A1 | 8/2012 | Hedberg et al. | | |
| 2012/0294254 A1 | 11/2012 | Behravan et al. | | |
| 2014/0112168 A1 | 4/2014 | Chen et al. | | |
| 2014/0228049 A1* | 8/2014 | Hannan | ............... | G01S 5/10 455/456.1 |
| 2019/0081759 A1* | 3/2019 | Wang | ............... | H04L 5/0091 |
| 2019/0116514 A1* | 4/2019 | Ookubo | ............... | H04W 24/10 |
| 2019/0356447 A1* | 11/2019 | Iwai | ............... | H04L 5/0051 |
| 2021/0282103 A1* | 9/2021 | Zhu | ............... | H04W 76/15 |

FOREIGN PATENT DOCUMENTS

| | | |
|---|---|---|
| WO | 2007/010220 A2 | 1/2007 |
| WO | 2011/016804 A1 | 2/2011 |
| WO | 2013/079556 A1 | 6/2013 |
| WO | 2013/188629 A2 | 12/2013 |

OTHER PUBLICATIONS

Mjolsnes, et al., Easy 4G/LTE IMSI Catchers for Non-Programmers, International Conference on Mathematical Methods, Models, and Architectures for Computer Network Security, 2017, pp. 235-246.

Ooi, Joseph, IMSI catchers and mobile security School of Engineering and Applied Science University of Pennsylvania, EAS 499 Senior Capstone Thesis, 2015, pp. 1-47.

www.prnewswire.com/news-releases/trueposition-announces-release-of-iot-location-product-300224729.html, True Position Announces Release of IoT Location Product, Feb. 24, 2016, pp . 1-3.

Qi Liu, et al., A Wireless Location System in LTE Networks, Hindawi Mob. Inf. Syst., 2017, pp. 1-11.

Shaik, et al., Practical attacks against privacy and availability in 4G/LTE mobile communications systems, 2015, pp. 1-16.

www.sibat.mod.gov.il/Industries/directory/Documents/Sibatdir-HLS-en2018-19.pdf, Homeland and Cyber Defense Directory 2018-19, 2018, pp. 1-151.

Sorseth, Christian, Location Disclosure in LTE Networks by using IMSI Catcher (Master's thesis, NTNU), Norwegian University of Science and Technology, 2017, pp. 1-148.

* cited by examiner

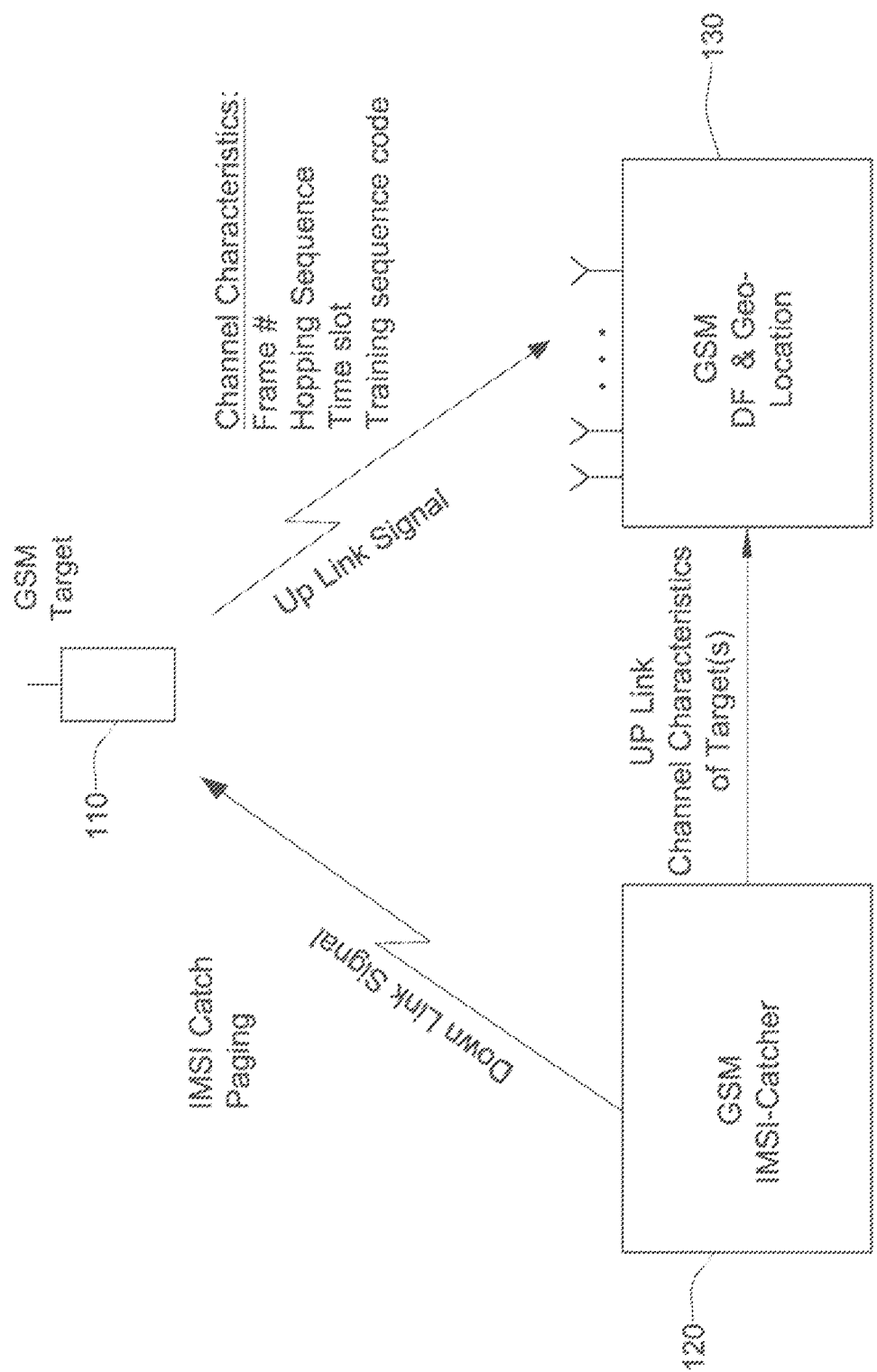

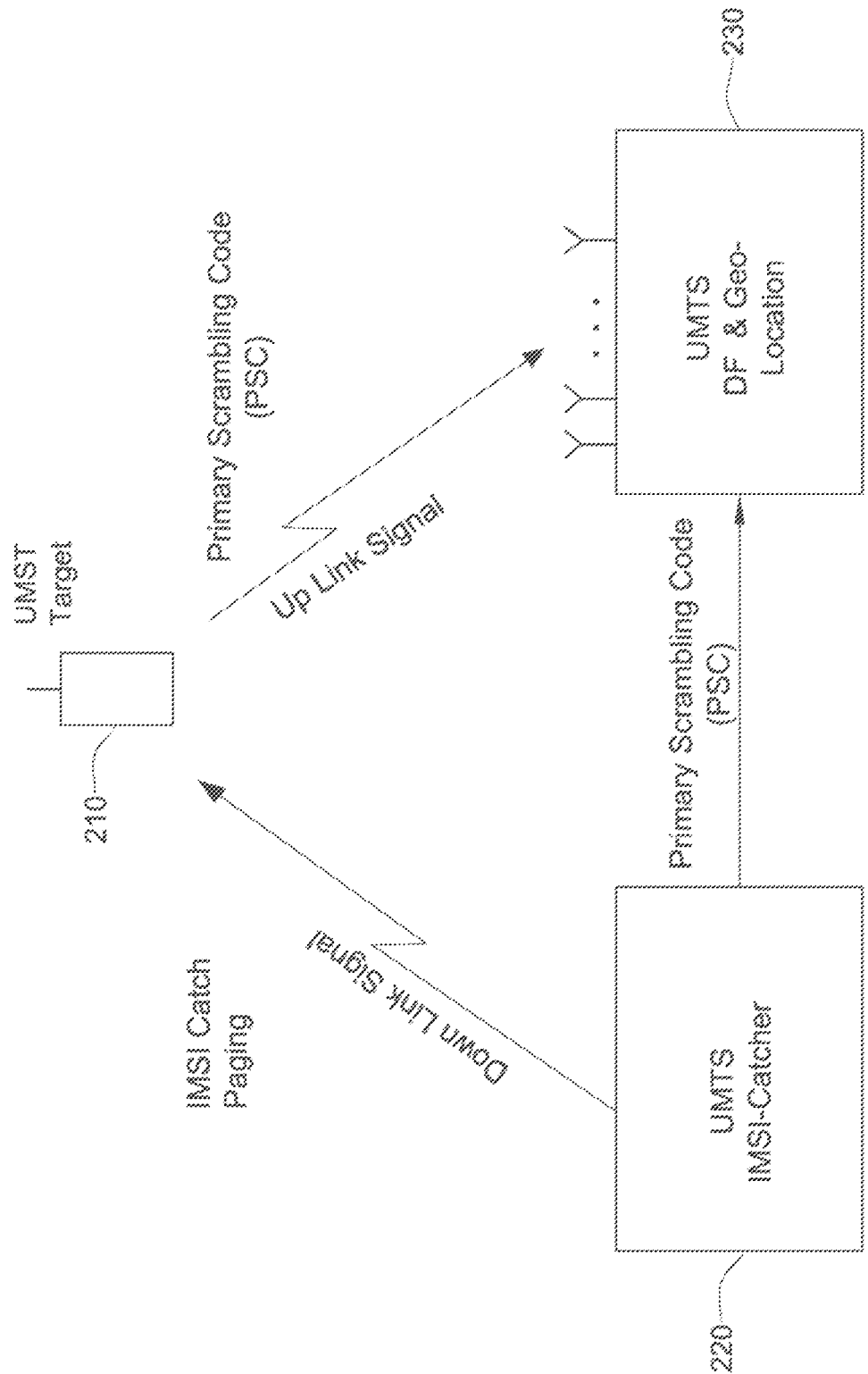

SYSTEM METHOD AND COMPUTER PROGRAM PRODUCT FOR DIRECTION FINDING AND/OR IDENTIFICATION OF GEO-LOCATION, FOR MOBILE PHONES OPERATING IN LTE (4G)

REFERENCE TO CO-PENDING APPLICATIONS

This Israel patent application does not claim priority from any previously filed patent application.

FIELD OF THIS DISCLOSURE

The present invention relates generally to cellphones, and more particularly to localizing cellphones.

BACKGROUND FOR THIS DISCLOSURE

Monitoring systems for secret services include IMSI Catchers; such devices act as a false base station to implement a man-in-the-middle attack in mobile networks. Christian Sørseth's "Location Disclosure in LTE Networks by using IMSI Catcher", available on-line (file:///C:/Users/sudym/Downloads/17146_FULLTEXT.pdf), describes that "On top of disclosing the IMSI (International Mobile Subscriber Identity) and intercept network traffic, the IMSI Catchers track the movement of mobile users. Recently, low-cost IMSI Catchers were proved feasible for LTE too. LTE location attacks allow an adversary to track the presence or absence of an IMSI in a given area, sometimes even localizing the IMSI in an area tighter than a cell range."

Example implementations of IMSI Catchers in 4G, using OpenLTE, srsLTE or gr-LTE, are described on-line in:

"*Easy 4G/LTE IMSI Catchers for Non-Programmers*", Stig F. Mjølsnes and Ruxandra F. Olimid; and "*Practical Attacks Against Privacy and Availability in 4G/LTE Mobile Communication Systems*", Altaf Shaik, Ravishankar Borgaonkar, N. Asokan, Valtteri Niemi and Jean-Pierre Seifert Also, the DTT 2G IMSI/IMEI catcher is an off-the-shelf active system, based on a laptop and a smart compact BTS, which operates, without interfering with external mobile GSM ($2^{nd}$ generation e.g.) networks, invisibly, so that the mobile station subscriber is unable to detect it, forcing GSM ($2^{nd}$ generation e.g.) phones or handsets in its vicinity to make a handover into the 2G catcher and register to it, thereby detecting their presence. The system has two basic operation modes: Random (all handsets); and 2. IMSI or/and IMEI (only targets).

Thespyphone.com's PORTABLE IMSI/IMEI catcher is a pocket-sized battery operated device which allows conducting close-up operations covertly while located in a target's immediate vicinity. The device can also be used as a portable cellular locator (PCL) for tactical geo-location tracking and identity extraction. The device supports all GSM ($2^{nd}$ generation e.g.) (900/1800, 850/1900), UMTS (2100, 1900, 1700, 900, 850), LTE bands. Combined with another compact thespyphone.com unit, which need not be co-located, the catcher also provides full interception capabilities (Call Interceptor, SMS and Data).

Accurate Direction Finding (DF) and Geo-Location measurements of mobile cellular phones are widely used for Search and Rescue, Law Enforcement, Security and Managed Access. Existing technical solutions applicable for most cellular technologies involve active manipulation of a selected target UE by changing its Radio Access Technology (RAT) to specific "quiet frequency" in GSM (2G) band(s) for further direction finding and geo-location, using various types of Direction Finding (DF)s and homing devices.

In the United States at least, any cellphone which calls 911 is automatically localized. This was done, for $2^{nd}$ generation phones, by deploying passive fixed sensors, termed "local measurement units" or LMUs, on each base station then using TOA-based localization. Cooperation between the law enforcement authorities and the cell network service companies was required.

TruePosition Inc., which no longer appears to be active, described itself as a provider of wireless location solutions and claimed to have a Machine to Machine/Internet of Things (M2M/IoT) location product. The TrueFix system's M2M/IoT capabilities would enable M2M platform providers, operators, chipset manufacturers and system integrators to locate devices and would include a Software Development Kit (SDK) whose bandwidth, device memory and power consumption requirements are suitable for small devices. The TruePosition solution used a binary protocol to send and receive location data, the company said. At the core of the TrueFix platform was the TruePosition Wi-Fi location solution powered by the Skyhook Wireless Wi-Fi database. The TruePosition solution required cooperation from cell-phone network operators.

The "howltestuffworks" blog describes that "Sounding Reference Signal (SRS) is a reference signal transmitted by the UE in the uplink direction which is used by the eNodeB to estimate the uplink channel quality over a wider bandwidth. The eNodeB may use this information for uplink frequency selective scheduling. The eNodeB can also use SRS for uplink timing estimation as part of timing alignment procedure, particularly in situations in which there are no PUSCH/PUCCH transmissions occurring in the uplink for a long time, in which case the eNodeB relies on SRS for uplink timing estimation. SRS does not need to be transmitted in the same physical resource blocks where PUSCH is transmitted, as SRS may stretch over a larger frequency range.

There are 3 types of SRS transmissions defined in LTE. From release-8 onwards 'Single SRS' transmission and 'Periodic SRS' transmissions are supported. In release-10, 'Aperiodic SRS' transmission is introduced."

EP2462461 describes hybrid location in an LTE Network, including a method for estimating a location of a wireless device receiving signals from plural nodes of a communications network. The method comprises directing a wireless device to transmit a sounding reference signal ("SRS") or demodulation reference signal ("DMRS") with one or more predetermined parameters, and transmitting the SRS or DMRS signal by the wireless device.

WO2013079556 describes determining a handover control decision based on the determined backhaul resource quality. determining the handover control decision includes a decision whether or not a handover of the user equipment is to be performed and/or whether or not base station parameters of the base station the user equipment is connected to, or intended to be connected to, are modified.

US2011124347 describes UE Positioning in LTE Networks for user equipment positioning in networks including joint scheduling of UL subframes and receiving a Up Link Positioning Reference Signal (UL-PRS) and computing a location of user equipment by network equipment that serves at least one cell site. The UL-PRS is received in a known subframe. Computing may also include estimating an arrival time of the UL-PRS from the UE for a plurality of cell sites.

EP2862411 describes an all-purpose broadband network system which seeks to improve locating and tracking user equipment inter alia. Two aspects of locating the UE within an RF beam sub-area are determining the RF beam location when the UE first accesses the Cell (i.e., after the Random Access procedure, or after a Handover procedure, or after a Service Request procedure), and then tracking the UE across the RF beam sub-areas as the UE moves throughout the Cell coverage area. Two methods may be available for developing algorithms for locating the UE within an RF beam and for tracking a UE across RF beams, namely, Channel Quality Indicator (CQI) measurements, and Sounding Reference Signal (SRS) measurements. A CQI measurement may be returned by a UE after it measures a channel quality signal that is transmitted by the Cellular wireless RF base station. An SRS signal may be transmitted by the UE, and detected by the Cellular wireless RF base station and may be used to determine the uplink channel quality.

US2010309852 describes transmitting an uplink SRS by an LTE UE comprising the UE receiving information N indicating SRS transmission; generating an SRS sequence by the UE; and the UE transmitting the SRS in two OFDM symbol in a half-frame or frame if the information N indicates that a period of SRS transmission is 2 ms. A format of SRS in LTE FDD and LTE TDD will be the same, a problem of supporting 2 ms period in the LTE TDD system is solved.

RES-Q-CELL is commercially available from Elta Systems Ltd. The following link: http://www.sibat.mod.gov.il/Industries/directory/Documents/Sibatdir-HLS-en2018-19.pdf describes ":Mobile phones can provide vital survivor location information to first responders and emergency search & rescue teams. The Res-Q-Cell system delivers high accuracy 3-dimensional geo-location of mobile phones, enabling detection of survivors and casualties buried under wreckage sites. Res-Q-Cell is designed for a wide range of search & rescue scenarios, including post terror attack wreckage sites, earthquakes, war and combat zones, and location of missing persons in urban or remote areas. Res-Q-Cell supports world-wide cellular networks and provides passive and active capabilities. The system detects mobile phones within a predefined area, identifies the mobile phones, supports white list & black lists, and provides highly accurate 3-dimensional GeoLocations of survivors under the wreckage. The system can be installed on a variety of platforms, including, but not limited to, tactical man-packs, soft vehicles, armored vehicles, tactical aerostats, helicopter and UAV."

The disclosures of all publications and patent documents mentioned in the specification, and of the publications and patent documents cited therein directly or indirectly, are hereby incorporated by reference. Materiality of such publications and patent documents to patentability is not conceded Abbreviations Herein Include:

IMEI aka International Mobile Equipment Identification, is an example of a unique identifier assigned to each physical phone device.

IMSI aka International Mobile Subscriber Identification is an example of a unique identifier assigned to each SIM (Subscriber Identification Module) card. IMSI is associated with all GSM, UMTS and LTE network SIM cards and is stored on the SIM card and the register HLR as a 64 bit field sent by the phone to the network. The IMSI is used in any mobile network that interconnects with other networks and may be provisioned in the phone directly or in the R-UIM card. The IMSI bits typically represent: MCC aka Mobile Country Code, which uniquely identifies the mobile subscriber's country; followed by MNC aka Mobile Network Code, which uniquely identifies the mobile subscriber's mobile network; followed by MSIN aka Mobile Subscription Identification Number which uniquely identifies the mobile subscriber among the network's population of subscribers.

I/Q: in-phase/quadrature

PSC or Primary Scrambling Code as used herein is intended to include a Pseudo Noise sequence (or set of sequences), or "long scrambling code", that a UMTS base station (e.g. Node-B) assigns to each UE e.g. for the purpose of segregation and separation between multiple UEs that are in connection with that single Node-B.

SUMMARY OF CERTAIN EMBODIMENTS

Certain embodiments seek to localize a given LTE cellphone defined (e.g. by police or other law enforcement authorities) as a target, typically without requiring cooperation from the target phone's cell operator or cell network service provider, e.g. by causing the phone to transmit to the system of the invention.

Certain embodiments seek to provide accurate Direction Finding (DF) and/or geo-Location measurements for "target" mobile cellular phones (aka User Equipment—UE), where measurements are typically done from a stand-off position, and/or "off the Air" and/or with minimal influence on the "target" mobile phone and/or on the local cellular networks including their normal level of service.

The system of the invention typically comprises an (at least one) active segment or catcher, typically comprising a set of multi technology—"fake" cellular base stations, e.g. "IMSI Catchers" (typically one catcher covering each cellular technology employed by the various target UEs), And/or Passive Direction Finding (DF)/Geo-Location segment(s) which incorporate multi technologies/multi algorithms for Direction Finding and/or geo-location of specific cellphones transmissions.

The active segment typically causes target phones to transmit their signals with specific assigned parameters. These parameters, while received and extracted by the Passive Direction Finding (DF)/Geo-Location segment of the system of the invention, provide the use of unique methods for targets' segregation and accurate Direction Finding (DF)/Geo-Location measurements.

The system of the invention may be capable to operate in GSM (2G), UMTS (3G) and LTE (4G) or any subset thereof.

The active segment typically triggers the Passive Direction Finding (DF)/Geo-Location segment in real time. Both segments are typically synchronized in time. Operational configuration may include multiple Passive Direction Finding (DF)/Geo-Location segments that are synchronized in time. Own location of segments and time synchronization of all system elements is performed using GPS devices.

Plural passive df/geolocation-modules may be provided; the df/geolocation-modules may be co-located with the catcher/s (e.g. aboard aircraft or vehicle) or may be remote from the catcher/s (but cover the area of interest) and may communicate wirelessly with the catcher/s.

According to certain embodiments, a system is provided, for localizing cellphones served by a (typically commercial) network of base-stations, the system comprising at least one of the following:

at least one DF/geolocation module typically including a DF and/or geolocation controller and at least one set of receivers operative to receive uplink signal/s transmitted by cellphone/s; and/or at least one catcher having a real time internal system interface with the DF/geolocation module, each catcher typically including:

at least one transmitter and/or at least one receiver, configured to activate mobile phones and to extract their IDs in an area of coverage for the catcher, and a catcher-controller, the transmitter in the catcher typically being controlled by the catcher-controller to send, typically to at least one individual cellphone, a signal, typically including signal content that is typically unique to the individual cellphone and that the individual cellphone is typically configured, when operating according to a given cell network protocol, to transmit, typically along an uplink to a base station, thereby, typically, to cause each individual cellphone in a current target subset of cellphones aka target cellphones, when within the catcher's area of coverage, to transmit to the catcher, signal content (including at least one parameter) which is, typically, unique, typically within the current subset, only to that individual cellphone and not to any other cellphone in the current subset, wherein the catcher controller typically triggers the DF/Geolocation controller in real time while the signal is on the air, typically by sending the signal content e.g. via the real time internal system interface to the DF/Geolocation controller, and wherein the DF/geolocation controller is typically operative, responsive to receipt of the signal content, to scan incoming transmissions e.g. uplink signals received by the DF/geolocation module receiver in real time, typically including comparing the uplink signals to signals which are typically received and extracted from the incoming transmissions e.g. uplink signals, in real time, typically by filtering the incoming transmissions (e.g. using digital signal processing), those transmissions which are arriving from a cellphone whose identifier is included in the signal content, thereby, typically, to differentiate targets whose identifier is included in the signal content from non-targets whose identifier is not included in the signal content; and/or to trigger the DF/geolocation module, typically in real time, to localize the transmissions which correspond (e.g. are equal in identity) to the signal content, thereby to generate, typically in real time, target location data e.g. geo-location data indicative of locations of each target cellphone that has entered the catcher's area of coverage, and, typically, to output an indication of the target location data, typically in at least near real time thereby, typically, to localize, in near real time, any target cellphone that has entered the catcher's area of coverage.

The given cell network protocol typically comprises LTE for at least one target phone and the signal content typically comprises an SRS code assigned uniquely to each target phone.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations and instead, the remote processor P itself may receive output/s of portion/s of the operation from yet another processor/s P', may be deployed off-shore relative to P, or "on a cloud", and so forth.

The present invention typically includes at least the following embodiments:

Embodiment 1: A system for localizing cellphones served by commercial network of base-stations and operative in conjunction with at least one catcher including a catcher-controller, and at least one transmitter and at least one receiver, thereby to define an area of coverage for the catcher, the system comprising: at least one DF/geolocation module including a DF/geolocation controller and at least one set of receivers operative to receive uplink signal/s transmitted by cellphone/s: the DF/geolocation module, having a real time internal system interface with each catcher, wherein, if the transmitter in the catcher is controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within the current subset, only to that individual cellphone, and not to any other cellphone in the current subset, and each time the catcher controller triggers the DF/Geolocation controller in real time while the signal is on the air, by sending the signal content via the real time internal system interface to the DF/Geolocation controller, the DF/geolocation controller is operative, responsive to receipt of the signal content to scan incoming transmissions e.g. uplink signals received by the DF/geolocation module receiver in real time, including comparing the uplink signals to signals received and extracted from the incoming transmissions e.g. uplink signals, in real time, by filtering the incoming transmissions (using digital signal processing), those transmissions which are arriving from a cellphone whose identifier is included in the signal content, thereby to differentiate targets whose identifier is included in the signal content from non-targets whose identifier is not included in the signal content; to trigger the DF/geolocation module, in real time, to localize the transmissions which correspond (are equal in identity) to the signal content, thereby to generate, in real time, target location data indicative of locations of each target cellphone that has entered the catcher's area of coverage, and to output an indication of the target location data, in near real time, thereby to localize, in near real time, any target cellphone that has entered the catcher's area of coverage, wherein the given cell network protocol comprises LTE and the signal content comprises an SRS code assigned uniquely to each target phone.

Embodiment 2. A system according to any of the preceding embodiments and also comprising at least one catcher having a real time internal system interface with the DF/geolocation module, each catcher including: at least one transmitter and at least one receiver, thereby to define an area of coverage for the catcher, and a catcher-controller, the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within the current subset, only to that individual cellphone, and not to any other cellphone in the current subset, wherein the catcher controller triggers the DF/Geolocation controller in real time while the signal is on the air, by sending the signal content via the real time internal system interface to the DF/Geolocation controller.

Embodiment 3. A system according to any of the preceding embodiments and wherein the signal content comprises an SRS code assigned uniquely only within a set of active targets and wherein at least one SRS code assigned to at least one target a is re-assigned, once target a is no longer active, to at least one target b which is currently active.

Embodiment 4. A method for localizing cellphones served by commercial network of base-stations, the method comprising: providing at least one DF/geolocation module including a DF/geolocation controller and at least one set of receivers operative to receive uplink signal/s transmitted by cellphone/s; and providing at least one catcher having a real time internal system interface with the DF/geolocation module, each catcher including: at least one transmitter and at least one receiver, thereby to define an area of coverage for the catcher, and a catcher-controller, the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within the current subset, only to that individual cellphone, and not to any other cellphone in the current subset, wherein the catcher controller triggers the DF/Geolocation controller in real time while the signal is on the air, by sending the signal content via the real time internal system interface to the DF/Geolocation controller, and wherein the DF/geolocation controller is operative, responsive to receipt of the signal content, to scan incoming transmissions e.g. uplink signals received by the DF/geolocation module receiver in real time, including comparing the uplink signals to signals received and extracted from the incoming transmissions e.g. uplink signals, in real time, by filtering the incoming transmissions (using digital signal processing), those transmissions which are arriving from a cellphone whose identifier is included in the signal content, thereby to differentiate targets whose identifier is included in the signal content from non-targets whose identifier is not included in the signal content; and to trigger the DF/geolocation module, in real time, to localize the transmissions which correspond (are equal in identity) to the signal content, thereby to generate, in real time, target location data indicative of locations of each target cellphone that has entered the catcher's area of coverage, and to output an indication of the target location data, in near real time, thereby to localize, in near real time, any target cellphone that has entered the catcher's area of coverage, and wherein the given cell network protocol comprises LTE and the signal content comprises an SRS code assigned uniquely to each target phone.

Embodiment 5. A method according to any of the preceding embodiments wherein a Time Difference of Arrival (TDOA) algorithm is used to generate the target location data.

Embodiment 6. A method according to any of the preceding embodiments wherein a Direction Finding (DF) algorithm is used to generate the target location data.

Embodiment 7. A system according to any of the preceding embodiments wherein the DF/geolocation module is triggered to localize only those transmissions which correspond to the signal content.

Embodiment 8. A method according to any of the preceding embodiments wherein Direction Finding is used to derive plural lines of bearing of a cellphone and geo-location data is derived from the plural lines of bearing Embodiment 10. A system according to any of the preceding embodiments wherein the identifier comprises a unique identifier assigned to physical phone devices.

Embodiment 11. A system according to any of the preceding embodiments wherein the identifier comprises a unique identifier assigned to phone devices' SIM card such as IMSI aka International Mobile Subscriber Identification Embodiment 12. A catcher system operative in conjunction with a DF/geolocation module, and including: at least one catcher having a real time internal system interface with a DF/geolocation module, each catcher including: at least one transmitter and at least one receiver, thereby to define an area of coverage for the catcher, and a catcher-controller, the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within the current subset, only to that individual cellphone and not to any other cellphone in the current subset, wherein the catcher controller triggers the DF/Geolocation controller in real time while the signal is on the air, by sending the signal content via the real time internal system interface to the DF/Geolocation controller.

Embodiment 13. A method according to any of the preceding embodiments and wherein the SRS code assigned to the target phone is unique only within a set of active targets because at least one SRS code assigned to at least one target a is re-assigned, once target a is no longer active, to at least one target b which is currently active.

Embodiment 14. A system according to any of the preceding embodiments wherein the given cell network protocol comprises UMTS for at least one target phone and the signal content comprises a primary scrambling code assigned uniquely to each target phone for which the given cell network protocol comprises UMTS.

Embodiment 15. A system according to any of the preceding embodiments wherein the given cell network protocol comprises GSM for at least one target phone and the signal content comprises at least one channel characteristic assigned uniquely to each target phone for which the given cell network protocol comprises GSM.

Embodiment 16. A computer program product, comprising a non-transitory tangible computer readable medium having computer readable program code embodied therein, the computer readable program code adapted to be executed to implement a method for localizing cellphones served by commercial network of base-stations, the method comprising: providing at least one DF/geolocation module including a DF/geolocation controller and at least one set of receivers operative to receive uplink signal/s transmitted by cellphone/s; and providing at least one catcher having a real time internal system interface with the DF/geolocation module, each catcher including: at least one transmitter and at least one receiver, thereby to define an area of coverage for the catcher, and a catcher-controller, the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within the current subset, only to that individual cellphone and not to any other cellphone in the current subset, wherein the catcher controller triggers the F/Geolocation controller in real time while the signal is on the air, by sending the signal content via the real time internal system interface to the DF/Geolocation controller, and wherein the DF/geolocation controller is operative, responsive to receipt of the signal content, to scan incoming transmissions e.g. uplink signals received by the DF/geolocation module receiver in real time, including comparing the uplink signals to signals received and extracted from the incoming transmissions e.g. uplink signals, in real time, by filtering the incoming transmissions (using digital signal processing), those transmissions which are arriving from a cellphone whose identifier is included in the signal content, thereby to differentiate targets whose identifier is included in the signal content from non-targets whose identifier is not included in the signal content; and to trigger the DF/geolocation module, in real time, to localize the transmissions which correspond (are equal in identity) to the signal content, thereby to generate, in real time, target location data indicative of locations of each target cellphone that has entered the catcher's area of coverage, and to output an indication of the target location data, in near real time, thereby to localize, in near real time, any target cellphone that has entered the catcher's area of coverage, and wherein the given cell network protocol comprises LTE and the signal content comprises an SRS code assigned uniquely to each target phone.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing: a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or even on a single integrated circuit or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist: and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Example embodiments are illustrated herein, as follows:

FIG. 1a is a simplified functional block diagram of a GSM Direction Finding (DF) &/or Geo-Location system which performs localization of a GSM cellphone (aka target) according to an embodiment of the invention.

FIG. 1b is a simplified functional block diagram of a UMTS Direction Finding (DF) &/or Geo-Location system which performs localization of a UMTS cellphone (aka target) according to an embodiment of the invention.

Figure 1C:
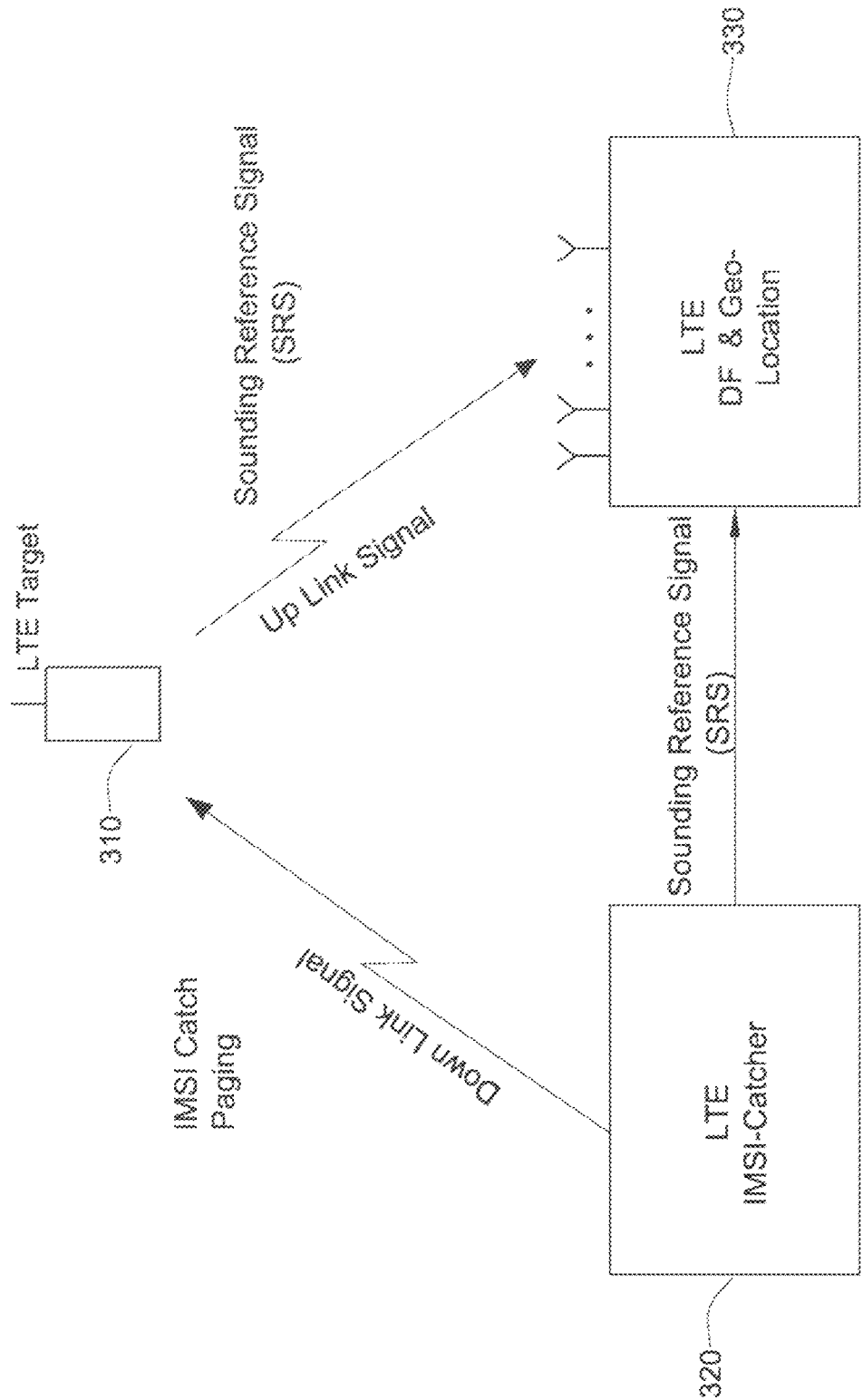
FIG. 1c is a simplified functional block diagram of an LTE Direction Finding (DF) &/or Geo-Location system which performs localization of a LTE cellphone (aka target) according to an embodiment of the invention.

It is appreciated that the various illustrated embodiments may be combined in any combination.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

A system and method are described herein which typically utilizes the SRS parameter to localize "target" cellphones using the LTE protocol, without requiring cooperation from the target phones' cellphone service providers, e.g. by allocating SRS codes and storing an indication to whom each SRS code is currently allocated, e.g. as per any of the methods and systems described herein.

The term "Catcher" is intended to include any hardware and/or firmware and/or software module which gathers phone identities in a given area of coverage, the module typically having active intercept capabilities, typically simulating a cell tower mobile network or base station, typically operative to establish a fake connection between a mobile phone to be monitored and itself (as opposed to "authentic" connections between the phone and the base station which actually serves the phone), the module typically including a base station. The base station typically operates as the strongest tower or base station available to the cellphones in its area such that cellphones operating in the area try to connect to the catcher's base station rather than to the base station serving that cellphone on behalf of the cell network to which the monitored cellphone belongs. Once connected to a mobile phone, the catcher is typically operative to capture or gather the cellphone IDs and/or cause the cellphone to transmit, data which uniquely identifies the cellphone, e.g. IMSI and/or IMEI, which respectively uniquely identify the monitored cellphone's SIM Card and the cell phone itself. Since phone identities correspond, to a large extent, to identities of persons, catchers may be integrated to other modules e.g. surveillance cameras, face recognition, biometric systems, scanners, license plate recognition modules, to generate value from the phone identities gathered by the catcher. For example, the integrate module may alert upon detection of pre-defined "target" mobile phones, a catcher may be composite, operating in plural networks e.g. 2G and/or 3G and/or 4G networks in an integrated hardware, covering plural existing cell network standards or protocols e.g. LTE and/or UTMS and/or GSM.

The term cellphone, target etc. are intended to include but not be limited to any of the following: mobile telephone, smart phone, playstation, iPad, TV, remote desktop computer, game console, tablet, mobile e.g. laptop or other computer terminal, embedded remote unit.

Direction Finding and/or Geo-Location of target mobile devices is often required e.g. for law enforcement authorities or civil search and rescue forces. When no cooperation from the networks' service providers is available, wireless, off the air interception methods may be used to receive, detect, and extract the required Up Link (U/L) signals for further Direction Finding (DF) and/or geo-Location measurements. Operational scenarios include fixed installation, vehicular (mobile, stationary or on the move), and airborne.

Certain embodiments provide a cell network protocol-specific (e.g. GSM/UMTS/LTE) method for causing a unique (to the target phone) signal to be sent over the uplink from the target mobile station aka UE to the base station, and hence also to the fake base station aka catcher. The system of the invention thus has a range/area of operation aka area of coverage aka area of interest. The system may be deployed, say, to cover an area which includes a designated junction or stadium or building/s or other area which requires monitoring.

The coverage area is determined by the effective range of the IMSI catcher. Typical range of operation may be several hundreds of meters in a very urban dense environment, and up to 20 km in rural open areas.

Depending on the cellular technology (communication protocol), a specific method of generating an unique uplink signal from the target mobile station aka UE is used:

GSM (2G)—a specific Training Sequence Code and "Channel characteristics/Time slot/frame number" is assigned by the active segment to each target, typically for a limited period; the same Training Sequence Code and/or "Channel characteristics/Time slot/frame number" may be re-assigned by the active segment to a later target e.g. after the first target has been "caught". Typically at any given time, each Training Sequence Code and each "Channel characteristics/Time slot/frame number" is assigned by the active segment to only one target.

UMTS (3G)—a specific "known" Primary Scrambling Code (PSC) is assigned for each target UE aka cellphone. Typically, at any given time, a set of Primary Scrambling Code(s) (PSC) is assigned to a set of target cellphones and the catcher and/or df-module maintains a table which stores current associations between PSC's and an identifier of the cellphones to which each PSC is assigned. Typically, a specific Primary Scrambling Code (PSC) assigned to a "first" target cellphone at a "first" time t1, may later be re-assigned to a "second" target cellphone at time t2 (e.g. if the first phone is no longer an active target at time t2). The table storing current PSC and cellphone-identifier associations, is then updated accordingly to reflect that the re-assigned PSC is now associated with the identifier of the second cellphone rather than with the identifier of the first cellphone.

LTE (4G)—a specific "known" Sounding Reference Signal or SRS code is assigned for each target UE. Typically, at any given time, a single SRS code is assigned to only one single target cellphone and the catcher and/or DF-module maintains a table which stores current associations between SRS codes and an identifier of the target cellphone to which each SRS code is assigned. Typically, since there are less SRS codes than there are targets, a single SRS code is assigned to a first target cellphone at a first time t1, and may later be re-assigned to a second target cellphone at time t2. The table storing current SRS-code and cellphone-identifier associations, is then updated accordingly to reflect that the re-assigned SRS code is now associated with the identifier of the second cellphone rather than with the identifier of the first cellphone.

The catcher e.g. IMSI catcher is typically configured to imitate one of the base stations serving the phone population (including the target phones) in the area of interest, while changing that base station's LAC (aka Location Area Code).

The catcher may comprise a base station, configured to output data as described herein (e.g. SRS or PSC), via a suitable data interface, in real time, to the DF-module. The interface is typically LAN and the protocol via which the data flows out of the catcher, is typically TCP-IP. The catcher may be mounted in a fixed location or may be mobile e.g. mounted aboard a vehicle or aircraft, or may be portable, or even wearable. Typically, the catcher catches target phones continuously or periodically. As each target phone is caught, the catcher then triggers, in real time, the DF/geo-location module ("passive").

Any suitable technology may be employed to synchronize triggers in real time so as to trigger the DF/geolocation-module, in real time, for example, conventional GPS clocks e.g. a rubidium atomic clock can generate triggers with a 0.1 nanosec resolution.

Mobile phones in the area of interest that receive the catcher signal, detect the different (relative to conventional base stations) LAC (Location Area Code), and respond to this transmission with a Location Update Procedure (request), such that all the IDs (IMSI/IMEI) are thus transmitted to the Catcher e.g. IMSI catcher and retrieved.

Then the parameters e.g. channel characteristics/SRS/PSC are sent by the catcher to the geo-location/DF module for each target phone the catcher catches, or finds, or detects. This triggers the geo-module in real time, responsive to which the geo-module localizes that target phone only (the target phone whose IMSI (say)) is known to be associated with the SRS code (say) sent by the catcher, and typically discards all data arriving over the uplink, which pertains to non-target phones.

Typically, the geo-location/DF module performs direction finding by Interferometer Direction of Arrival (DOA) Direction Finding.

The active segment is typically configured to cover all RF bands and carrier frequencies used by any provider in the Area Of Interest (AOI). The active segment of the system is configured and capable to capture all mobile phones of a single provider at a time. This is done in all three technologies (2G, 3G, 4G) simultaneously. This may be achieved by using catchers e.g. IMSI Catchers for all above technologies simultaneously e.g. as described in FIG. 3.

The catchers e.g. IMSI Catchers may perform/support one or both of the following procedures aka main network procedures:

Broadcast with different LAC (Location Area Code), causing UE registration for "Location Update" procedures (in which all relevant IDs (IMSI/IMEI) are transmitted to the Catcher e.g. IMSI catcher and retrieved).

and/or

Paging or "Silent Call" for specific targets in the area.

The Catcher e.g. IMSI catcher typically does not perform any network authentication of target phones.

The passive Direction Finding (DF)/Geo-Location segment is typically configured to perform Direction Finding (DF)/Geo-Location measurements during typically very short network events-periods (typically from 100 mSec to 1 Sec) of network transactions: RACH/PRACH (Random Access Channel), Location Updates (in which all relevant IDs (IMSI/IMEI) are transmitted to the Catcher e.g. IMSI catcher and retrieved), etc. However, tracking targets by their Geo-Location is typically done by using the catcher segment for paging the targets specifically and conducting a "silent call" for a suitable, typically mission-dependent time duration (as determined by a timer, not shown).

During each active transaction of the IMSI catcher, TA (Timing Advance) and/or PD (Propagation Delay) parameters may be extracted/generated. These parameters give the system rough measurements of the targets' range from the catcher terminal/antenna. The TA (Timing Advance) and/or PD (Propagation Delay) parameters may be used together with DF measurements (e.g. lines on operators' GUI map) for suitable e.g. conventional geo-location algorithms e.g. as described below.

Example embodiments are now described:

FIG. 1a

In FIG. 1a, the GSM Direction Finding (DF) and/or geo-Location module 130 aka GSM (2G) Catcher e.g. IMSI catcher triggering of the location module typically includes Channel Characteristics/Parameters for each target—e.g. Channel Type and/or Frame Number and/or Type and/or Hopping Sequence and/or Time Slot. The GSM Direction Finding (DF) and/or geo-Location unit uses these Channel Characteristics/Parameters to segregate or filter out targets e.g. as described herein, thereby to localize only targets and not localize non-targets.

Triggering may be performed in real time or near-real time, so the GSM Direction Finding (DF) and/or geo-Location unit receives and detects the uplink signal of the targets' during the Location Update procedure (in which all relevant IDs (IMSI/IMEI) are transmitted to the Catcher e.g. IMSI catcher and retrieved).

Known "Training Sequence Code" of the GSM (2G) Catcher e.g. IMSI catcher may be used by the GSM Direction Finding (DF) and/or geo-Location module 130 for correlation on the incoming uplink signals thereby to achieve accurate and sensitive correlation: it is appreciated that in the GSM mobile communication standard, the base station is configured to select one of eight training sequence codes as the midamble of the downlink transmitted bursts.

For each Direction Finding (DF) measurement, an appropriate TA indication may be combined to for a geo-location computation of the target.

FIG. 1b

Typically, the UMTS (3G) Catcher e.g. IMSI catcher 220 of FIG. 1b is configured to assign a specific "Primary Scrambling Code" (PSC) for each target. These PSCs are provided to the UMTS Direction Finding (DF) and/or geo-Location module 230 by a real time interface between the units. The UMTS Direction Finding (DF) and/or geo-Location module 230 uses the PSC of the targets to perform correlation on the incoming uplink signals, thereby to achieve accurate and sensitive correlation. For each Direction Finding (DF) measurement, an appropriate PD indication may be combined to for a geo-location combination of the target.

FIG. 1c

Typically, the LTE (4G) Catcher e.g. IMSI catcher 320 is configured to assign a specific "Sounding Reference Signal" (SRS) for each target. These SRSs are provided to the LTE Direction Finding (DF) and/or geo-Location module 330 by a real time interface between catcher 320 and module 330. These SRSs are used in real time by the LTE Direction Finding (DF) and/or geo-Location module 330 for correlation on the incoming uplink signals, thereby to achieve accurate and sensitive correlation.

For each Direction Finding (DF) measurement, an appropriate PD indication may be combined to for a geo-location computation of the target.

The catcher 120 in FIG. 1a is configured to internally derive target uplink characteristics (Frame # and/or Hopping sequence and/or Time slot and/or Training sequence code) and is configured to supply a stream of such sets of characteristics aka parameter sets (each parameter set including characteristics relating to a different target T), in real time, to an external module e.g. module 130 of FIG. 1a.

The catcher 220 in FIG. 1b is configured to internally derive PSC parameters and is configured to supply a stream of such sets of characteristics aka parameter sets (each parameter set including characteristics relating to a different target T), in real time, to an external module e.g. module 230 of FIG. 1b.

The catcher 320 in FIG. 1c is configured to internally derive SRS parameters and is configured to supply a stream of such sets of characteristics aka parameter sets (each parameter set including characteristics relating to a different target T), in real time, to an external module e.g. module 330 of FIG. 1c.

Typically, the cellular RF frequency spectrum is scanned for detection and listing of existing local networks and service providers. For each service provider, a list of base stations IDs is generated. For each base station, all neighboring cells (Inter and Intra) are listed; this data may for example be stored in DB 440.

Subsequently, when target identities are caught, the catcher e.g. IMSI catcher, is typically configured to imitate one of the low power neighboring base stations while changing its LAC (aka Location Area Code). All mobile phones that receive the Catcher e.g. IMSI catcher signal (which is typically of high enough power to compete with the power of the base station serving the target (and other) cellphones), and detect the different (relative to the local set of base stations serving the target (and other) cellphones) LAC (Location Area Code), "responds" to this transmission with a Location Update Procedure (request), during which all relevant IDs (IMSI/IMEI) are transmitted to the Catcher e.g. IMSI catcher and retrieved. All retrieved IDs (IMSI/IMEI) are typically compared to "Black Lists and/or White Lists" for targets' segregation. The catcher e.g. IMSI catcher, typically releases the mobile phones appearing on the "White List" to their native networks very shortly after ID catching. Typically, IMEI is not transmitted or retrieved in LTE, so in operating in LTE, "Black Lists/White Lists" are managed using IMSI only.

The system generates and maintains a data base of targets aka "Target Book", which may include "Black Lists and/or White Lists" which may, for example, be stored IN DB 440. For example, law enforcement authorities may provide lists of phone numbers IDs (IMSI/IMEI), of target phones to be captured or caught or considered as targets by the active segment of the system, target cellphones may be defined e.g. by a law-enforcement organization or other enterprise, or manually by a designated human.

Other criteria for targets' segregation or definition of targets may be type of equipment, e.g. as derived from the IMEI, roaming devices, etc.

It is appreciated that target cellphones may be defined by omission i.e. a set of white-listed cellphones are all defined as non-targets (say: all phones known to frequent this area of interest, which may have been previously vetted) and all phones other than these white-listed cellphones, are then deemed targets.

Target cellphones may be defined on a one-time basis, or periodically, or on-occasion.

The data defining which phones are (or are not) target phones typically comprises a plurality of unique identifiers of the target phones (or their SIMs or the cell network end-user which bears them) such as IMEI, IMSI.

The Direction Finding (DF) and/or geo-Location unit(s) can measure Direction Finding (DF)s during short procedures as RACH/PRACH and Location Updates (in which all relevant IDs (IMSI/IMEI) are transmitted to the catcher e.g. IMSI catcher, and retrieved).

However, for "continuous" target tracking (which may be defined as an operational mode of the system), the catcher e.g. IMSI catcher, may be configured for specific paging and silent calls to a list of specific targets.

FIG. 2

Figure 2:
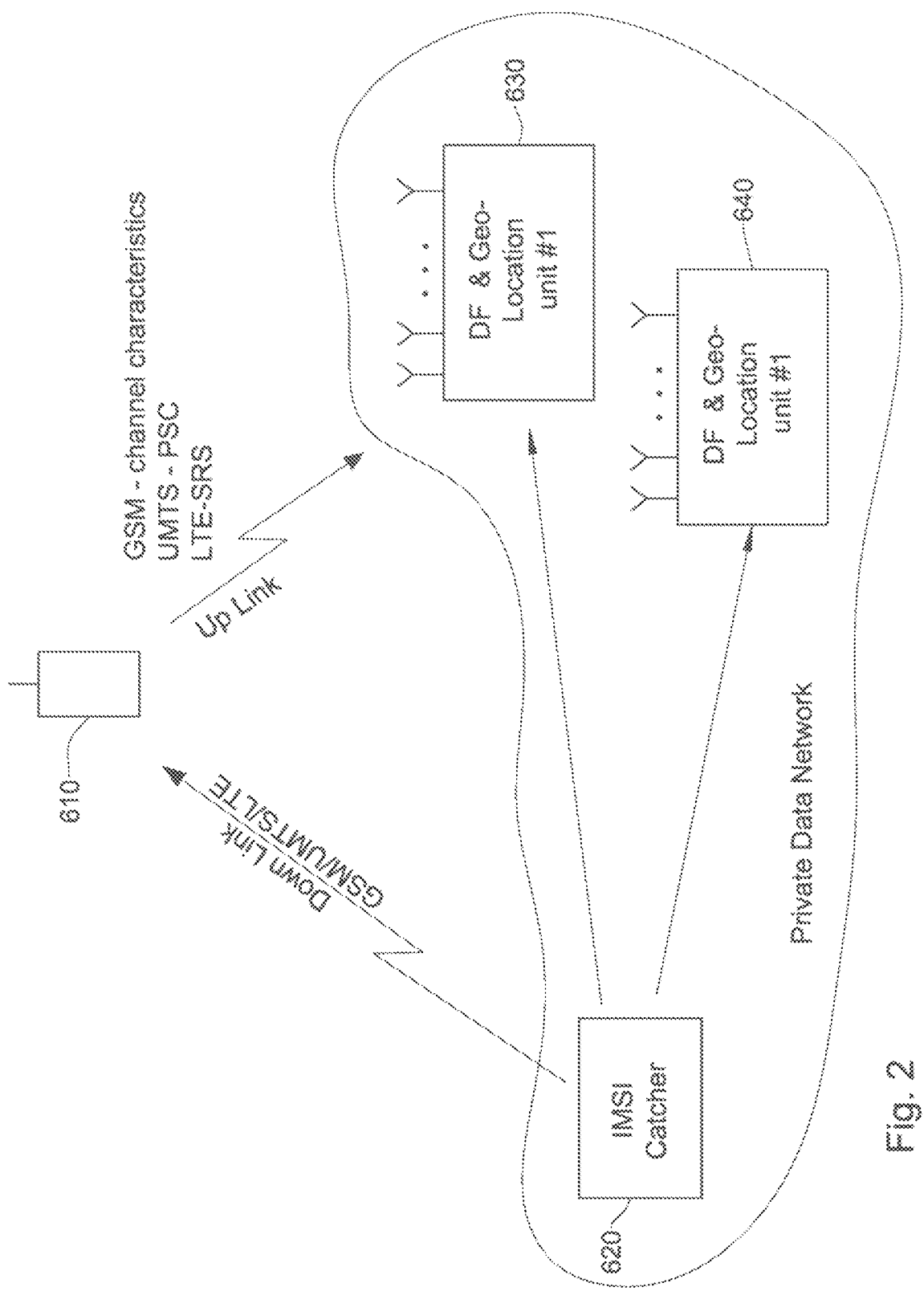
FIG. 2 is a simplified block diagram illustration of an embodiment of the invention which includes plural DF/geo-location modules.

It is appreciated that Multiple (two or more) Direction Finding (DF) and/or geo-Location modules 1-n (of which, for simplicity, 2 modules 630, 640 are shown in FIG. 2) may be simultaneously operated and triggered by a single catcher (e.g. IMSI catcher 620), as shown in FIG. 2. In this case, all units are typically connected in a private network, typically synchronized and typically perform simultaneous measurements. The measurements result from all Direction Finding (DF) and/or geo-Location modules may be combined to yield an accurate fixed location of targets. From each unit, an Angle Of Arrival (AOA) may be measured and displayed on a map, typically together with the range derived from Timing Advance (TA) and/or Propagation Delay (PD) indications. A fixed location may then be obtained e.g. if all results are displayed on a single monitor. When a single DF module is used, Geo Location may be provided by combining the direction measurement and Timing Advance (TA) and/or Propagation Delay (PD), whereas if plural DF modules are used, the multiple direction measurements typically yield an accurate location without needing to use TA/PD (Timing Advance (TA) and/or Propagation Delay (PD)).

Direction Finding (DF) and/or geo-Location units may use various algorithms such as but not limited to any of the following: the Interferometer Direction of Arrival (DOA) Direction Finding (DF) algorithm is the leading technology for tactical systems. In the system of the invention, a linear array of four (4) (say) matched antennas is used for Direction Finding (DF).
Four (4) phase matched receiving paths are incorporated for targets' U/L signals detection, and analog to digital conversion. The detected base band I/Q samples may be further demodulated and may be correlated or compared with the (known, e.g. as provided to the geo-location/DF module by the catcher) data patterns and sequences (e.g. with the Channel Parameters & Training Sequence Code in the GSM embodiment of FIG. 1a, with the Primary Scrambling Code, PSC in the UMTS embodiment of FIG. 1b, and with the Sounding Reference Signal, SRS in the LTE embodiment of FIG. 1c).

Other geo location techniques may be employed depending inter alia on the platform on which the system is installed. When the system is on the move, specifically airborne, e.g. installed on aircraft(s) in addition to, or alternatively to, the Direction Finding (DF), (interferometer based) algorithm described above, Frequency Different of Arrival (FDOA or Differential Doppler—DD) may be employed.

In case of fixed installation and/or operation of three (3) or more DF and Geo Location systems, Time Difference of Arrival (TDOA) techniques may be employed, in addition to or alternatively to the Direction Finding (DF), (interferometer based) algorithm described above.

Time Difference of Arrival (TDOA) techniques may be employed also in an airborne configuration while there are at least two (2) platforms simultaneously operational.

These airborne techniques take advantage of the fact that a platform is moving relatively fast, so frequency changes related to Doppler effects may be measured then used e.g. as additional input, thereby to yield enhanced algorithms.

For airborne systems, an accurate (e.g. GPS based, or inertial based (INS)) inertial navigation system may be used to derive (in real time) all or any subset of the following: platform own location, heading, speed, pitch/roll/yaw. These parameters may be used as inputs by the Geo-Location (e.g. Difference of Arrival (DOA) algorithms.

Figure 3:
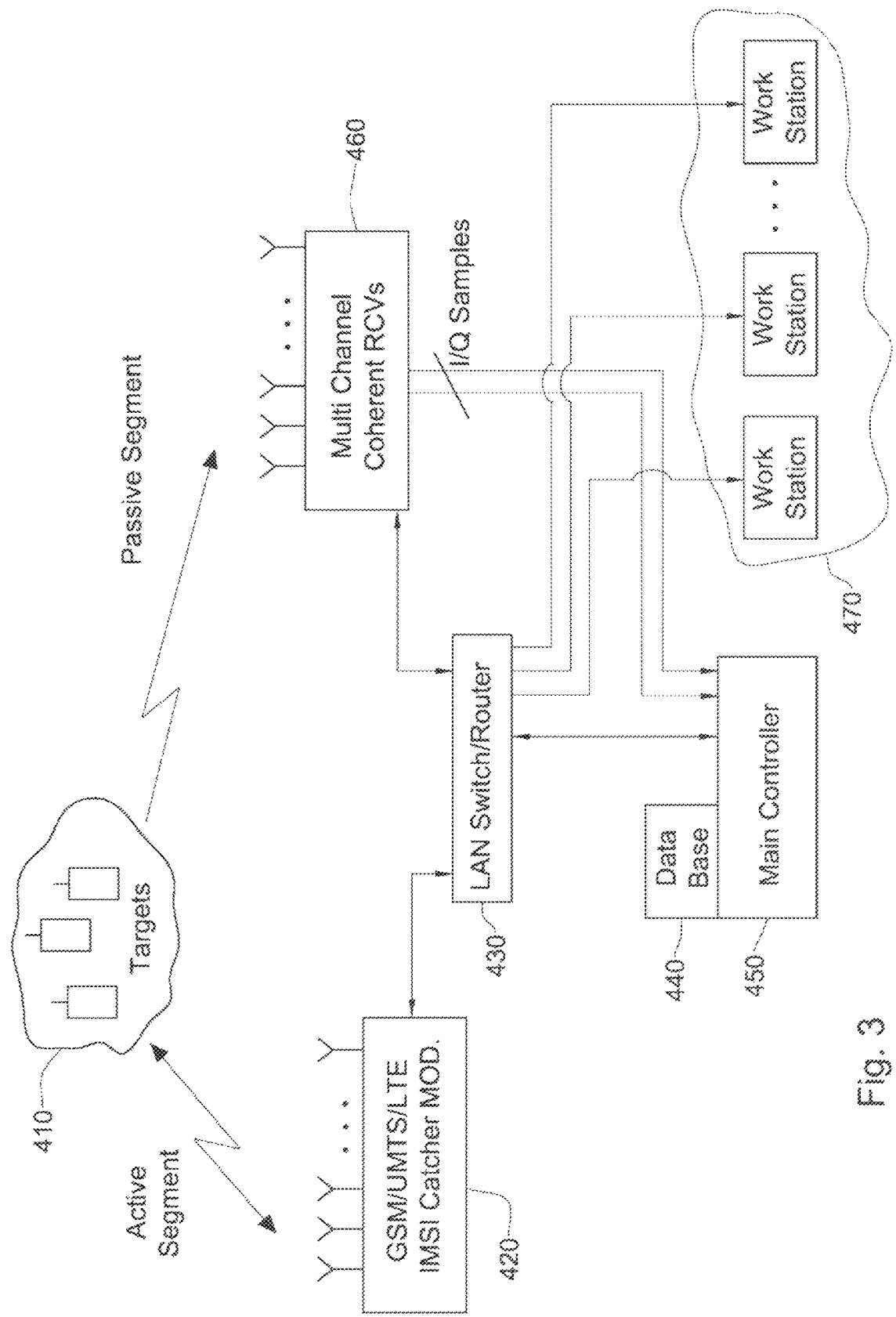
FIG. 3 is a simplified block diagram illustration of an embodiment of the invention which includes a composite Catcher that covers plural technologies, a composite multi technologies, and a DF & Geo-Location sub system that comprises Multi-Channel Coherent receivers. In the illustrated configuration, DF and Geo-Location computations are based on I/Q samples transferred from the receivers to the main controller that typically incorporate provisions for correlators and demodulators—e.g. as required to demodulate the relevant signal (according to the modulation technology used), and to correlate with the known input sequence/data, e.g. Training Sequence Code and/or "Channel characteristics/Time slot/frame number" (GSM), Primary Scrambling Code (UMTS), Sounding Reference Signal (LTE). A central data base may be used to store all targets IDs and locations. Multi work stations may be provided for user operations e.g. as described herein.

It is appreciated, again, that the GSM, UMTS and LTE embodiments are not exclusive and that, if desired, GSM and/or UMTS and/or LTE catchers may be provided in a single composite catcher e.g. as shown in FIG. 3 (block 420). Typically, such a composite catcher comprises a first catcher operative to receive from and transmit to cellphones currently being served by a base station operative in accordance with a first cellular communication protocol, and at least a second catcher operative to receive from and transmit to cellphones currently being served by a base station respectively operative in accordance with at least one second cellular communication protocol respectively. A single target-book may be employed by all of the plural catchers, if desired, for simplicity.

A particular advantage of this embodiment is that plural catchers (which may be implemented in a single "multi-generational" hardware including plural generation-specific e.g. protocol-specific catchers e.g. including a 2 g catcher, a 3 g catcher and a 4 g catcher), may operate simultaneously, thereby to respectively activate and ID catch cellphones which are being serviced by network/s operating in accordance with plural cellular communication protocols. If a first target cellphone is being serviced using a 2 g protocol, the 2 g catcher will activate and catch that cellphone, whereas a second cellphone being serviced using a 4 g protocol, will be activated and caught by the 4 g catcher.

Phase difference measurements and comparison of the four (4) received data paths comprise a unique Angle Of Arrival (AOA) of a target signal towards the linear antenna array. Knowing the relative angle of the array toward the north (using compass or differential GPS), a Direction Of Arrival (DOA) may be computed and displayed on a map.
FIG. 3

FIG. 3 is block diagram illustration of the system of the present invention, according to certain embodiments. The system typically includes a System Main Controller 450, Catcher 420—typically composite (GSM/UMTS/LTE), Multi-channel Coherent Receivers 460 and Work Stations 470.

The system separation into Active and Passive Segments is shown. The Main Controller typically has both active and passive tasks.
All modules may be connected via local Ethernet (e.g. via LAN switch/router 430).

System Main Controller 450 is typically operative to perform all or any subset of the following tasks:
Configure/control of the Catcher e.g. IMSI catcher and targets' management
Configure/control of the receivers and computation of Direction Finding (DF) and/or geo-Location
Creation and maintain "target book" and data base
The main controller also typically maintains the system's data base.
The controller may even be implemented in firmware, rather than including an operating system. An Internal scheduler may be provided e.g. in order to automatically schedule all system's tasks e.g. according to system configuration and resources. The scheduler may determine how many transmitters are used at any specific time, what type of base stations are operated at any given time, how many DF & geo-location sensors to trigger simultaneously, etc.
A spectrum scan is done by the catcher e.g. IMSI catcher periodically, when the system is stationary, or continuously, when the system is on the move. The catcher, e.g. IMSI catcher, is then typically configured, according to the data generated by the spectrum scan, to "catch" all mobile phones in the vicinity of the system, and extract their IDs (IMSI/IMEI).

The Main Controller typically creates and maintains "target book" and/or data base e.g. as described herein.

According to certain embodiments, the system covers a single cellular operator/provider at a time. So the main controller configures the catcher e.g. IMSI catcher accordingly e.g. indicating that currently the operator being covered is operator x.

In the passive segment—the Main Controller configures and triggers the Multi-channel Coherent Receivers 460 which typically generate base band I/Q samples. The base band I/Q samples generated by the Multi-channel Coherent Receivers are typically provided to the Main Controller. The Main Controller performs signal processing (e.g. Correlation and/or Demodulation) of the I/Q sequences. The correlation and/or demodulation may be performed based on the known sequences of the received data, e.g. channel characteristics (GSM), and/or Scrambling Codes of targets (UMTS), and/or Sounding Reference Signals (LTE). The de-correlated/demodulated raw data is further processed by phase difference (Direction Finding (DF) of the coherent channels, or time difference (TDOA) or differential Doppler (DDPhase) thereby to generate Direction Finding (DF) and/or geo-Location data for each target. Each Direction Finding (DF) and/or geo-Location datum is typically stored by the Main Controller in a data base, in association with the ID of the target whose location and direction the datum describes.

Work Stations 470 may be manned by system operators and may be used to allow the human operators to interface with tasks such as, say, mission planning, and/or set up of network parameters for the IMSI Catcher, and/or determining type and/or technology for the DF and Geo-Location unit, and/or setting "black lists" of targets to create target book for the system, and/or retrieval of target locations e.g. geo-locations either in real time or from data base, creation of locations on a map, exporting target files, etc.

The GSM/UMTS/LTE Catcher e.g. IMSI catcher 420 typically comprises a multi-band multi-channel and multi technology set of active base stations typically including at least one GSM base station and/or at least one UMTS base station and/or at least one LTE base station, configured to perform catcher e.g. IMSI catcher functions including providing data in real time to the geolocation-DF module as described herein. Typically the GSM/UMTS/LTE catcher, e.g. IMSI catcher, is configured to cover all bands and all technologies of any cellular service providers expected to be present in the area of interest. So typically, the final configuration of a system is determined as a result of a site survey in the area of interest. The system architecture is typically flexible enough to support changes in commercial cellular networks serving the target phones, e.g. by using Digital to Analog chip sets capable of generating either GSM and/or UMTS and/or LTE waveforms at base band, IF and RF levels, and/or a set of power amplifiers that cover all known commercial bands. The catcher e.g. GSM/UMTS/LTE catcher e.g. IMSI catcher, is typically configured to transmit simultaneously in all bands, all frequency carriers and all technologies of any provider the system is to cover (e.g. of all cell service providers found, during the survey, to be present in the area of interest).

The GSM/UMTS/LTE catcher e.g. IMSI catcher, is typically configured to extract all available targets' IDs: IMSI and/or IMEI and/or TMSI. It is appreciated that typically, IMEI is not available in LTE. Also, TMSI, when extracted, is typically the TMSI that was assigned by the commercial network.

The GSM/UMTS/LTE catcher e.g. IMSI catcher, is also typically configured to conduct paging and/or silent calls for targets e.g. selected targets. Catcher e.g. IMSI catcher, is also typically configured to control the uplink transmitted power of the targets' mobile phones.

All specific assigned parameters used to specifically identify the targets and segregate between them, e.g. Channel Characteristics (GSM), Primary Scrambling Codes (PSC—UMTS) and Sounding Reference Signals (SRS—LTE) of all targets are output, typically constantly, in real time, via the LAN interface to the system's Main Controller 450.

The Multi-channel Coherent Receivers typically comprise plural e.g. four (4) wide band coherent receivers, typically sufficing in number to cover all cellular commercial frequency bands and bandwidths. Receivers may employ direct sampling or may comprise conventional super heterodyne dual conversion receivers. The Analog to Digital Convertors (ADC) may have a 14 bit minimum dynamic range. For a Direction Finding (DF) system—the receivers may be connected to a linear array of matched phase antennas and cables. The outputs of the receivers typically comprise plural e.g. four (4) streams of I/Q samples combined in a suitable conventional interface. The I/Q samples stream is provided to the system Main Controller, in which Direction Finding (DF) processing is performed.

Typically, for the interferometer algorithm, one antenna and receiving path is considered as reference, so three (3) phase differences are measured by the Direction Finding (DF) algorithm to provide a single Direction Of Arrival—DOA.

FIG. 4

Figure 4:
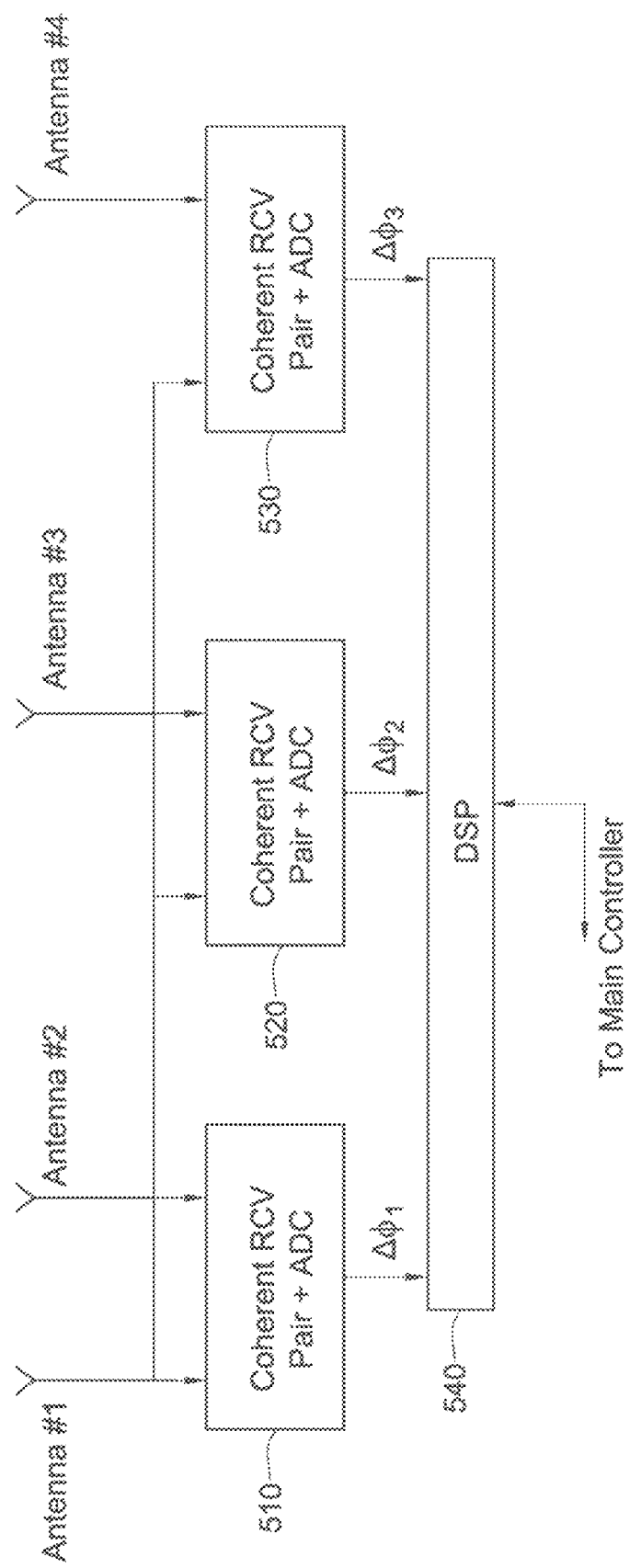
FIG. 4 is a simplified block diagram illustration of an embodiment of the invention which includes three pairs of coherent receivers and ADCs used for Direction Finding (DF) as opposed to four (4) coherent receivers.

It is appreciated that the illustrated hardware configuration of four (4) coherent receivers is only one possible embodiment. For example, as an alternative, three pairs of coherent receivers and ADCs may be used for Direction Finding (DF) performed e.g. by the main controller; this configuration with suggested connections is shown in FIG. 4. It is appreciated that coherent receiver's pairs are common in commercial chip-sets, making the embodiment of FIG. 4 particularly easy to implement.

The DSP may be implemented in hardware and may process samples received from the ADC. More generally it is appreciated that functionality of the controller 450 as described herein may in fact be performed by the illustrated DSP module.

It is appreciated that the illustrated embodiments are merely exemplary and are not intended to be limiting. Inter alia, components or elements of one embodiment, may be combined with components or elements of another.

An example flow is now described, operative e.g. in conjunction with the embodiment of FIG. 1c, for generating Direction Finding (DF) and/or geo-Location measurements of mobile targets that operate in LTE (4G), typically using a very basic low profile active operation. Similar flows, mutatis mutandis may be employed for the embodiments of FIGS. 1a, 1b. All operations below, or any subset thereof, may be provided, in any suitable order e.g. as below.

5. The system generates (and maintains) a data base of targets; aka "Target Book". Law enforcement authorities may provide lists of phone IDs (e.g. IMSI) of target phones to be captured and considered as targets by the active segment of the system; these identifiers are typically stored in the target-book. Alternatively or in addition, criteria for targets' segregation may be type of equipment, derived from the IMSI, roaming devices, etc.

10. Provide an IMSI/IMEI catcher which activates and "catches" each of the target phone/s. The catcher is typically configured to collect and/or identify and/or filter potential "targets". A specific SRS code is typically assigned to each of one or more selected targets (say, up to 8 targets simultaneously) and not to other phones which are not targets.

In Operation:

20. Periodically or continuously, the catcher "activates" one or more targets, each with a specific assigned SRS (aka SRS code). Activation typically includes paging of only the selected target UEs and not of other phones which are not targets, and/or "silent call" towards the selected target UEs and not to other phones which are not targets.

30. The activated target UE/s respond/s to the catcher with uplink transmissions (aka uplink signals) that contains the SRS code that the catcher assigned to that target in operation 20.

40. Module 330 performs RF reception/detection of the uplink transmissions arriving from the targets, and correlation of uplink signal(s) of each target including digitization to create base band I/Q samples of the required up link frequency band(s).

50. Module 330 performs correlation of the base band I/Q samples with the known SRS codes, and detects the specific up link signals of the required targets.

60. Generation of Location Data:

For example, Direction Finding (DF) by Linear Antenna Array may be employed. Interferometer: uplink signals of target(s), as detected in operation 50, are received using multi-channel coherent sampling e.g. plural (say, 4) phase matched antennas and phase matched receivers with phase coherent sampling channels to generate samples of received signals. The 4 (say) channels' I/Q coherent samples are used to compute the "Direction of Arrival" (DOA) of the target uplink signals. It is appreciated that more generally, any Direction Finding (DF) algorithm may be applied to the plural channels.

Alternatively or in addition, derive each target's Geo-Location e.g. by combined Direction Finding (DF) and range indications e.g. by combining the Direction Finding (DF) measurements generated in operation 60, as a line (e.g. line of bearing that may point to target) from the Interferometer antenna array site to the target, with Timing Advance (TA)/Propagation Delay (PD) indications from the catcher e.g. IMSI catcher—to find fixed location of target(s).

Alternatively or in addition, derive each target's Geo-Location by combining two or more Direction Finding (DF) sensors: Combining multiple (2 or more) Direction Finding (DF) measurements as lines from the Interferometer antenna array sites to the target, to yield a fixed location on a map.

Alternatively or in addition, derive each target's Geo-Location using uplink Differential Time Of Arrival (uD-TOA) technique: receiving the uplink signals of target(s) in each of multiple locations around the target(s) or in standoff, and perform uDTOA measurements to create a fixed Geo-Location of targets.

Regarding all Embodiments, the Following May be Added:

It is appreciated that, according to certain embodiments, unique assignment of SRS (or PSC) to a given target, need be unique only within a set of active targets where a target is considered active if the system is seeking to localize that target and becomes inactive once the system no longer seeks to localize that target e.g. because the target has been successfully localized.

The system typically maintains a repository or bank of SRSs and/or PSCs that the catcher may use. Typically, a table is maintained e.g. in a data base used by both LTE IMSI Catcher (Module 420) and Main Controller (Module 450)) e.g. in database 440 in FIG. 3. In the table, the catcher typically populates active targets at the data base designated address in real time. Typically, active targets are populated by inputting the active targets' ID's (e.g., say, IMSI) for each line of SRS or of PSC. Upon successful DF/Geo-location measurement of a given target, the target's ID and DF/Geo-location measurement result are added by the main controller (or by the DF & geo location module 330) to the data base and then, the target(s) is/are no longer considered active and are typically transferred to a history data base in which all results are stored. The system then may re-use same SRS/PSC for another, new target.

According to certain embodiments, a table e.g. in the above database is maintained which indicates which SRS code (or PSC or other unique target-identifying data e.g. as described herein) is assigned, at this time, to each target. Targets may be identified, in the table, using any unique identifier e.g. as described herein, such as but not limited to IMSI.

All transmissions among the systems' elements or modules may be secured using any suitable data security technique e.g. Application of the advanced encryption standard (AES).

Connected devices may communicate with the system shown and described herein over the connected device's existing backhaul channels including protocols such as but not limited to 3GPP, WiFi, LORA.

Direct https access to the platform's API is optionally provided e.g. for devices on which installing an SDK is not desirable.

Typically, Periodic SRS is used for the benefit of the Direction Finding (DF). 'Periodic SRS' transmissions are typically 'trigger type 0' SRS transmissions which are configured by RRC signalling. Typically, after receiving RRC Connection configuration message with UE specific SRS configuration and if parameter duration is set to FALSE, the UE transmits SRS (e.g. transmits the appropriate one of the, say, 8 SRS codes) only once which is 'Single' SRS transmission, however if the parameter duration is set to TRUE, the UE transmits Periodic SRS indefinitely or until disabled where the SRS-Configindex parameter defines SRS periodicity (typically from 2 ms to 320 ms) and an offset. If the SRS code assigned for the target which is to be localized, is transmitted periodically, the Direction Finding (DF) receivers can then demodulate and correlate the SRS code with a known code. In terms of design considerations, typically, all other things being equal, the more repetitions of the same code received, the better the results of the Direction Finding (DF) process.

An advantage of embodiments described herein is that it provides Direction Finding (DF) and/or Geo-Location measurements of mobile target phones that operate, say, in LTE (4G)—even though the UEs all use the same RF band and SC-FDMA waveforms to transmit to the base station serving them—e.g. by actively assigning a specific "Sounding Reference Signal" (SRS) to each of the at least one targets; and by using the multi-channel receivers/multi-technology detectors and algorithms to distinguish, based (say) on specific SRSs assigned uniquely to the targets, between the target UEs and other UEs. The correlation with the known SRS that is transmitted periodically provides a processing gain to the system, increases its effective signal to noise ratio, thus enabling the system to be effective, even when the received signals are very low. Accurate Direction Finding (DF) and/or geo-Location measurements of mobile cellular phones as described herein may be used for a wide variety of use-cases, including Search, Rescue, incrimination, Law Enforcement, Security and Managed Access, digital asset management, asset tracking, fleet management, resource tracking, emergency call location, M2M/IoT and enterprise applications.

A particular advantage of embodiments herein is that no cooperation is required from the network servicing a population of cellphones, in order to localize target cellphones within that population. In contrast, conventional cellphone localization systems often localize only cellphones which have "volunteered to be localized" by dialing 911 after first agreeing, in their service contracts, to be localized if they dial 911. In such systems, typically, a probe within the network is provided, but no catcher as described herein is provided, and localization can only be triggered by a 911 call.

An advantage of embodiments described herein is that the system operates "off the air" and requires no cooperation from cellular service providers.

An advantage of embodiments described herein is providing a new use for the LTE standard's SRS parameter (e.g. use for localizing as opposed to e.g. differentiating between user entities).

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices, such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable sub-combination, including with features known in the art (particularly although not limited to those described in the Background section or in publications mentioned therein) or in a different order. "e.g."

is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system for localizing cellphones served by commercial network of base-stations and operative in conjunction with at least one catcher including a catcher-controller, and at least one transmitter and at least one receiver, thereby to define an area of coverage for the catcher, the system comprising:
   at least one DF/geolocation module including
      a DF/geolocation controller and
      at least one set of receivers operative to receive uplink signal/s transmitted by cellphone/s;
   the DF/geolocation module, having a real time internal system interface with each catcher,
   wherein, if the transmitter in the catcher is controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content which is unique, within said current subset, only to that individual cellphone, and not to any other cellphone in the current subset, and each time the catcher controller triggers the DF/Geolocation controller in real time while the signal is on the air, by sending the signal content via the real time internal system interface to the DF/Geolocation controller,
   the DF/Geolocation controller is operative, responsive to receipt of said signal content to scan incoming transmissions e.g. uplink signals received by the DF/geolocation module receiver in real time, including comparing said uplink signals to signals received and extracted from said incoming transmissions e.g. uplink signals, in real time, by filtering said incoming transmissions, those transmissions which are arriving from a cellphone whose identifier is included in said signal content, thereby to differentiate targets whose identifier is included in said signal content from non-targets whose identifier is not included in said signal content; and
   to trigger the DF/geolocation module, in real time, to localize said transmissions which correspond to said signal content, thereby to generate, in real time, target location data indicative of locations of each target cellphone that has entered the catcher's area of coverage, and to output an indication of said target location data, in near real time, thereby to localize, in near real time, any target cellphone that has entered the catcher's area of coverage,
   wherein said given cell network protocol comprises LTE and said signal content comprises an SRS code assigned uniquely to each target phone,
   wherein a specific sounding reference signal (SRS) code is assigned to each target and not to other phones which are not targets, thereby to enable activation of at least one phone P which is a member of said target subset to respond with a signal which contains an SRS code assigned to phone P, without so activating phones which are not members of said target subset,
   wherein RF reception/detection of the uplink signals arriving from the targets, and correlation of uplink signal(s) of each target including digitization to create base band I/Q samples of the required up link frequency bands is performed, and wherein correlation of the base band I/Q samples with known SRS codes is performed including detecting the specific up link signals of the required targets, and wherein location data is generated by deriving each target's Geo-Location.

2. A system according to claim 1 and also comprising at least one catcher having a real time internal system interface with the DF/geolocation module, each catcher including:
   at least one transmitter and at least one receiver, thereby to define an area of coverage for the catcher, and
   a catcher-controller,
   the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within said current subset, only to that individual cellphone, and not to any other cellphone in the current subset,
   wherein the catcher controller triggers the DF/Geolocation controller in real time while the signal is on the air, by sending the signal content via the real time internal system interface to the DF/Geolocation controller.

3. A system according to claim 1 and wherein the signal content comprises an SRS code assigned uniquely only within a set of active targets and wherein at least one SRS code assigned to at least one target a is re-assigned, once target a is no longer active, to at least one target b which is currently active.

4. A system according to claim 1 wherein the DF/geolocation module is triggered to localize only those transmissions which correspond to said signal content.

5. A system according to claim 1 wherein said identifier comprises a unique identifier assigned to physical phone devices.

6. A system according to claim 1 wherein said identifier comprises a unique identifier assigned to phone devices' SIM card such as IMSI aka International Mobile Subscriber Identification.

7. A system according to claim 1 wherein said given cell network protocol comprises UMTS for at least one target phone and said signal content comprises a primary scrambling code assigned uniquely to each target phone for which said given cell network protocol comprises UMTS.

8. A system according to claim 1 wherein said given cell network protocol comprises GSM for at least one target phone and said signal content comprises at least one channel characteristic assigned uniquely to each target phone for which said given cell network protocol comprises GSM.

9. A system according to claim 1 wherein a single SRS code is assigned to only one single target cellphone and the catcher.

10. A system according to claim 1 wherein a DF-module maintains a table which stores current associations between SRS codes and an identifier of the target cellphone to which each SRS code is assigned.

11. A method for localizing cellphones served by commercial network of base-stations, the method comprising:
providing at least one DF/geolocation module including
a DF/geolocation controller and
at least one set of receivers operative to receive uplink signal/s transmitted by cellphone/s; and
providing at least one catcher having a real time internal system interface with the DF/geolocation module, each catcher including:
at least one transmitter and at least one receiver, thereby to define an area of coverage for the catcher, and
a catcher-controller,
the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content which is unique, within said current subset, only to that individual cellphone, and not to any other cellphone in the current subset,
wherein the catcher controller triggers the DF/Geolocation controller in real time while the signal is on the air, by sending the signal content via the real time internal system interface to the DF/Geolocation controller, and
wherein the DF/geolocation controller is operative, responsive to receipt of said signal content,
to scan incoming transmissions e.g. uplink signals received by the DF/geolocation module receiver in real time, including comparing said uplink signals to signals received and extracted from said incoming transmissions e.g. uplink signals, in real time, by filtering said incoming transmissions, those transmissions which are arriving from a cellphone whose identifier is included in said signal content, thereby to differentiate targets whose identifier is included in said signal content from non-targets whose identifier is not included in said signal content; and
to trigger the DF/geolocation module, in real time, to localize said transmissions which correspond to said signal content, thereby to generate, in real time, target location data indicative of locations of each target cellphone that has entered the catcher's area of coverage, and to output an indication of said target location data, in near real time, thereby to localize, in near real time, any target cellphone that has entered the catcher's area of coverage, and wherein said given cell network protocol comprises LTE and said signal content comprises an SRS code assigned uniquely to each target phone,
wherein a specific sounding reference signal (SRS) code is assigned to each target and not to other phones which are not targets, thereby to enable activation of at least one phone P which is a member of said target subset to respond with a signal which contains an SRS code assigned to phone P, without so activating phones which are not members of said target subset,
wherein RF reception/detection of the uplink signals arriving from the targets, and correlation of uplink signal(s) of each target including digitization to create base band I/Q samples of the required up link frequency bands is performed, and wherein correlation of the base band I/Q samples with known SRS codes is performed including detecting the specific up link signals of the required targets, and wherein location data is generated by deriving each target's Geo-Location.

12. A method according to claim 11 wherein a Time Difference of Arrival (TDOA) algorithm is used to generate said target location data.

13. A method according to claim 11 wherein a Direction Finding (DF) algorithm is used to generate said target location data.

14. A method according to claim 13 wherein Direction Finding is used to derive plural lines of bearing of a cellphone and geo-location data is derived from said plural lines of bearing.

15. A method according to claim 11 and wherein the SRS code assigned to the target phone is unique only within a set of active targets because at least one SRS code assigned to at least one target a is re-assigned, once target a is no longer active, to at least one target b which is currently active.

16. A catcher system operative in conjunction with a DF/geolocation module, and including:
at least one catcher having a real time internal system interface with a DF/geolocation module, each catcher including:
at least one transmitter and at least one receiver, thereby to define an area of coverage for the catcher, and
a catcher-controller,
the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content (including at least one parameter) which is unique, within said current subset, only to that individual cellphone and not to any other cellphone in the current subset,
wherein the catcher controller triggers the DF/Geolocation controller in real time while the signal is on the air, by sending the signal content via the real time internal system interface to the DF/Geolocation controller,
wherein the system generates and maintains a data base of targets including lists of IMSI of target phones to be captured,
wherein the catcher activates and catches each of the target phone/s given that a specific sounding reference signal (SRS) code is assigned to each target and not to other phones which are not targets, wherein, periodically or continuously, the catcher activates at least one target/s, each with a specific assigned SRS code by paging only the selected target UEs and not other phones which are not targets, and/or "silent call" towards the selected target UEs and not to other phones which are not targets, wherein the activated target UE/s respond/s to the catcher with uplink signals that contains the SRS code that the catcher assigned to that target, wherein RF reception/detection of the uplink signals arriving from the targets, and correlation of uplink signal(s) of each target including digitization to create base band I/Q samples of the required up link frequency band(s) is performed, and wherein correlation of the base band I/Q samples with known SRS codes is performed including detecting the specific up link signals of the required targets, and wherein location data is generated by deriving each target's Geo-Location.

17. A computer program product, comprising a non-transitory tangible computer readable medium having computer readable program code embodied therein, said computer readable program code adapted to be executed to implement a method for localizing cellphones served by commercial network of base-stations, the method comprising:

providing at least one DF/geolocation module including a DF/geolocation controller and at least one set of receivers operative to receive uplink signal/s transmitted by cellphone/s; and providing at least one catcher having a real time internal system interface with the DF/geolocation module, each catcher including:

at least one transmitter and at least one receiver, thereby to define an area of coverage for the catcher, and a catcher-controller the transmitter in the catcher being controlled by the catcher-controller to send, to at least one individual cellphone, a signal, including signal content that is unique to the individual cellphone and that the individual cellphone is configured, when operating according to a given cell network protocol, to transmit along an uplink to a base station, thereby to cause each individual cellphone in a current target subset of cellphones aka target cellphones, when within the catcher's area of coverage, to transmit to the catcher, signal content which is unique, within said current subset, only to that individual cellphone and not to any other cellphone in the current subset, wherein the catcher controller triggers the DF/Geolocation controller in real time while the signal is on the air, by sending the signal content via the real time internal system interface to the DF/Geolocation controller, and wherein the DF/geolocation controller is operative, responsive to receipt of said signal content, to scan incoming transmissions e.g. uplink signals received by the DF/geolocation module receiver in real time, including comparing said uplink signals to signals received and extracted from said incoming transmissions e.g. uplink signals, in real time, by filtering said incoming transmissions, those transmissions which are arriving from a cellphone whose identifier is included in said signal content, thereby to differentiate targets whose identifier is included in said signal content from non-targets whose identifier is not included in said signal content; and to trigger the DF/geolocation module, in real time, to localize said transmissions which correspond to said signal content, thereby to generate, in real time, target location data indicative of locations of each target cellphone that has entered the catcher's area of coverage, and to output an indication of said target location data, in near real time, thereby to localize, in near real time, any target cellphone that has entered the catcher's area of coverage, and wherein said given cell network protocol comprises LTE and said signal content comprises an SRS code assigned uniquely to each target phone, wherein a specific sounding reference signal (SRS) code is assigned to each target and not to other phones which are not targets, thereby to enable activation of at least one phone P which is a member of said target subset to respond with a signal which contains an SRS code assigned to phone P, without so activating phones which are not members of said target subset, wherein RF reception/detection of the uplink signals arriving from the targets, and correlation of uplink signal(s) of each target including digitization to create base band I/Q samples of the required up link frequency bands is performed, and wherein correlation of the base band I/Q samples with known SRS codes is performed including detecting the specific up link signals of the required targets, and wherein location data is generated by deriving each target's Geo-Location.

* * * * *